United States Patent
Wallace

(10) Patent No.: US 9,259,703 B2
(45) Date of Patent: Feb. 16, 2016

(54) SYSTEM FOR REMOVING SELENIUM FROM A FEED STREAM

(71) Applicant: Enviro Water Minerals Company, Inc., Houston, TX (US)

(72) Inventor: Paul Steven Wallace, Katy, TX (US)

(73) Assignee: Enviro Water Minerals Company, Inc., Houston, TX (US)

(*) Notice: Subject to any disclaimer, the term of this patent is extended or adjusted under 35 U.S.C. 154(b) by 48 days.

(21) Appl. No.: 13/965,622

(22) Filed: Aug. 13, 2013

(65) Prior Publication Data

US 2014/0045248 A1    Feb. 13, 2014

Related U.S. Application Data

(60) Provisional application No. 61/682,609, filed on Aug. 13, 2012.

(51) Int. Cl.
| | |
|---|---|
| *B01J 19/00* | (2006.01) |
| *C01B 19/02* | (2006.01) |
| *C02F 11/00* | (2006.01) |
| *B01D 9/00* | (2006.01) |
| *C02F 101/10* | (2006.01) |
| *B01D 11/02* | (2006.01) |

(52) U.S. Cl.
CPC ............. *B01J 19/00* (2013.01); *B01D 9/0036* (2013.01); *B01D 9/0054* (2013.01); *C01B 19/02* (2013.01); *C02F 11/004* (2013.01); *B01D 11/02* (2013.01); *C02F 2101/106* (2013.01)

(58) Field of Classification Search
CPC .. C02F 2101/106; C02F 11/004; B01J 19/00; B01D 9/0036; B01D 9/0054; C01B 19/02
See application file for complete search history.

(56) References Cited

U.S. PATENT DOCUMENTS

| | | | |
|---|---|---|---|
| 3,533,737 A | * | 10/1970 | Farr .............................. 423/305 |
| 4,127,235 A | | 11/1978 | Klaile et al. |
| 4,163,046 A | * | 7/1979 | Subramanian et al. ......... 75/418 |
| 4,298,442 A | | 11/1981 | Giuffrida |
| 4,381,232 A | | 4/1983 | Brown |
| 4,405,463 A | | 9/1983 | Jost et al. |
| 4,436,429 A | | 3/1984 | Strong et al. |

(Continued)

FOREIGN PATENT DOCUMENTS

WO    2007094659 A1    8/2007

OTHER PUBLICATIONS

McDonald, M. R., McClintock, J. B., Amsler, C. D., Rittschoff, D., Angus, R. A., Orihuela, B. & Lutostankski, K., "Effects of Ocean Acidification Over the Life History of the Barnacle Amphibalanus Amphitrite," Marine Ecology Progress Series 385:179-187 (2009).

(Continued)

*Primary Examiner* — Chester Barry
(74) *Attorney, Agent, or Firm* — Fletcher Yoder, P.C.

(57) ABSTRACT

A system for removing selenium from a solid feed stream includes a selenium dissolver configured to selectively dissolve elemental selenium from the solid feed stream and to produce a selenium rich solution and a crystallizer coupled to the selenium dissolver and configured to receive the selenium rich solution from the dissolver, to add an acid to the selenium rich solution, to remove purified selenium from the selenium rich solution, and to remove sulfur dioxide from the selenium rich solution.

20 Claims, 6 Drawing Sheets

(56) References Cited

U.S. PATENT DOCUMENTS

| | | | |
|---|---|---|---|
| 4,725,425 A | | 2/1988 | Lesher et al. |
| 5,221,528 A | | 6/1993 | Jongema |
| 5,250,185 A | | 10/1993 | Tao et al. |
| 5,366,514 A | | 11/1994 | Becnel, Jr. et al. |
| 5,417,491 A | | 5/1995 | Hornung et al. |
| 5,549,788 A | * | 8/1996 | Nykanen et al. ............ 162/29 |
| 5,765,945 A | | 6/1998 | Palmer |
| 5,858,240 A | | 1/1999 | Twardowski et al. |
| 5,925,255 A | | 7/1999 | Mukhopadhyay |
| 5,976,372 A | * | 11/1999 | Vesterager .............. 210/603 |
| 6,027,543 A | * | 2/2000 | Yoshizaki et al. ........... 71/11 |
| 6,030,535 A | | 2/2000 | Hayashi et al. |
| 6,036,740 A | | 3/2000 | Miller et al. |
| 6,183,644 B1 | * | 2/2001 | Adams et al. ............. 210/611 |
| 6,461,491 B1 | | 10/2002 | Hryn et al. |
| 6,482,305 B1 | | 11/2002 | Mani |
| 7,083,730 B2 | | 8/2006 | Davis |
| 7,147,361 B2 | | 12/2006 | Cecala et al. |
| 7,392,848 B1 | | 7/2008 | Bader |
| 7,419,606 B2 | * | 9/2008 | Johnson et al. ........... 210/752 |
| 7,459,088 B2 | | 12/2008 | Davis |
| 7,501,064 B2 | | 3/2009 | Schmidt et al. |
| 7,595,001 B2 | | 9/2009 | Arakel et al. |
| 7,861,955 B2 | | 1/2011 | Tracy et al. |
| 2003/0062306 A1 | * | 4/2003 | Perriello ................ 210/611 |
| 2003/0084693 A1 | * | 5/2003 | Sower ..................... 71/11 |
| 2006/0113254 A1 | * | 6/2006 | Heller et al. ............. 210/721 |
| 2007/0189945 A1 | | 8/2007 | Kopp et al. |
| 2007/0274884 A1 | * | 11/2007 | Jarvinen et al. ........... 422/236 |
| 2008/0185340 A1 | | 8/2008 | Bargeman et al. |
| 2008/0237123 A1 | | 10/2008 | Marston |
| 2009/0127360 A1 | | 5/2009 | Tracy et al. |
| 2010/0024172 A1 | * | 2/2010 | Ekkelenkamp ............ 23/301 |
| 2010/0163471 A1 | | 7/2010 | Elyanow et al. |
| 2011/0045558 A1 | * | 2/2011 | Bauweleers et al. ........ 435/144 |
| 2011/0198285 A1 | | 8/2011 | Wallace |
| 2011/0289846 A1 | | 12/2011 | Shaw et al. |
| 2011/0303607 A1 | | 12/2011 | Vora et al. |

OTHER PUBLICATIONS

Markus Busch, William E. Mickols, Steve Jons, Jorge Redondo, Jean De Witte, "Boron Removal in Sea Water Desalination," International Desalination Association, BAH03-039 (2003).
NRS Engineering Water Solutions, "Final Pilot Study Report—Texas Seawater Desalination Demonstration Project," (Oct. 2008).
Collin Green "Using Gypsum for the Treatment of Mine Water," Department of Chemical and Metallurgical Engineering, Faculty of Natural Sciences, Technikon Pretoria (Dec. 2003).
Stephen R. Grattan "Irrigation Water Salinity and Crop Production," University of California, Davis—Agriculture and Natural Resources, ANR Publication 8066 (2002).
Ittai Gavrieli Amos Bein, and Aharon Oren, "The Expected Impact of the Peace Conduit Project (The Red Sea-Dead Sea Pipeline) on the Dead Sea," Mitigation and Adaptation Strategies for Global Change, 10:3-22 (2005).
Dow Water Solutions, "Filmtec™ Reverse Osmosis Membranes," Technical Manual, Form No. 609-00071; (2010) pp. 1-180.
Dow Water Solutions, "DOWTM Filmtec™ Membranes—DOW™ Filmtec™ SW30XLE-440i Seawater Reverse Osmosis Element with iLEC Interlocking Endcaps," Product Information. Form No. 609-03003-1109; (2010) pp. 1-2.
Dow Water Solutions, "DOW™ Filmtec™ Membranes—DOW™ Filmtec™ SW30ULE-440i Seawater Reverse Osmosis Element with iLEC™ Interlocking Endcaps," Product Information, Form No. 609-03004-1109; (2010) pp. 1-2.
Dow Water Solutions, "Filmtec™ Membranes—Filmtec™ XLE-440 Extra Low Energy RO Element," Product Information. Form No. 609-00245-0606; (2010) pp. 1-2.
Dow Water Solutions, "DOW™ Ultrafiltration—High Turbidity and Temperature Fluctuation no obstacle for DOW™ Ultrafiltration," Case History, Form No. 795-00020-1108; (2010) pp. 1-5.
FAO Corporate Document Repository, Agriculture and Consumer Protection, "Water Quality for Agriculture"; http://www.fao.org/DOCREP/003/T0234E/TO234E05.htm (Feb. 10, 2010) pp. 1-15.
Seung-Hyun Kim, Jong-Sup Yoon, Seockheon Lee, "Utilization of Floc Characteristics for the Evaluation of Seawater Coagulation Process," Desalination and Water Treatment, Civil Engineering Department, Kyungnam University, Masan, Korea, 10 (2009) 95-100. *Presented at EuroMed 2008.
GE Water and Process Technologies, "Cloromat—Solution for Manufacturing Chlor-Alkali Chemicals: Sodium Hypochlorite, Hydrochloric Acid & Caustic Soda," Fact sheet (May 2008) p. 1-4.
GE Power & Water—Water & Process Technologies, "HERO" (2010) pp. 1-2.
ICL, "Harnessing Nature Creating Value," 3rd Annual NASDAQ-TASE Israeli Investor Conference, New York (Sep. 18, 2008) pp. 1-47.
Applied Membranes, Inc., "Water Treatment Guide—Temperature Correction Factor for Reverse Osmosis Membranes," (2007) pp. 1-2.
Nitto Denko and Hydranautics, "Chemical Pretreatment for RO and NF," Technical Application Bulletin No. 111, Revision C (Dec. 2008) pp. 1-16.
Chemical Processign.com, "To Avoid Silica-Scale Problems in Cooling Towers, Plant Personnel Turn to Unconventional Methods," Water Treatment's Gordion Knot; http://www.chemicalprocessing.com/articles/2003/235.html?page=print; (2003) pp. 1-9.
"Desalination: A National Perspective," Committee on Advancing Desalination Technology, National Research Council, The National Academies—Advisers to the Nation on Science, Engineering, and Medicine (2008) pp. 1-255.
Public Health and the Environment World Health Organization, "Desalination for Safe Water Supply—Guidance for the Health and Environmental Aspects Applicable to Desalination," Geneva (2007) pp. 1-173.
Gerald L. Mackie and Barb Crosbie, "Zebra Mussel Biofouling Control in Cottage and Other Small Volume Water Systems," The Georgian Bay Association (1999) pp. 1-87.
Ki-Won Baek, Sang-Hun Song, Seok-Hwan Kang, Young-Woo Rhee, Chang-Soo Lee, Bum-Jae Lee, Sam Hudson, and Taek-Sung Hwang, "Adsorption Kinetics of Boron by Anion Exchange Resin in Packed Column Bed," J. Ind. Eng. Chem., vol. 13, No. 3, (2007) 452-456.
EPA Selenium Purification_Scandium (1998) pp. 1-62.
Yoshinobu Tanaka, Reo Ehara, Sigeru Itoi, Totaro Goto, "Ion-exchange membrane electrodialytic salt production using brine discharged from a reverse osmosis seawater desalination plant," Journal of Membrane Science 222 (2003) 71-86.
Reclamation—Managing Water in the West, Desalination and Water Purification Research and Development Program Report No. 135, Pilot Testing of Zero-Discharge Seawater Desalination—Application to Selenium Removal from Irrigation Drainage, U.S. Department of the Interior Bureau of Reclamation, Apr. 2008, pp. 1-37.
Sallie J. Lee, Frank J. Liotta, Steven A. Schwartz, "A New Generation of Gypsum Dispersing Agents," Global Gypsum Conference 2003—Barcelona, Sep. 14-16, 2003, pp. 17.1-17.12.
T. Masuzawa, "Impurities Contained Inside the Crystals of Solar and Vacuum Evaporated Salts," Fifth International Symposium on Salt—Northern Ohio Geological Society, May 29-Jun. 1, 1979, Hamburg, Germany, pp. 463-473.
Seung Joon Kim, Young Geun Lee, Sanghoun Oh, Yun Seok Lee, Young Mi Kim, Moon Gu Jeon, Sangho Lee, In S. Kim, Joon Ha Kim, "Energy saving methodology for the SWRO desalination process: controrl of operating temperature and pressure," Desalination 249 (2009) 260-270.
Peter Eriksson, Markus Kyburz, Wil Pergande, "NF membrane characteristics and evaluation for sea water processing applications," Desalination 184 (2005) 281-294.
EPA Selenium Purification (1991) pp. 1-8.

* cited by examiner

SYSTEM FOR REMOVING SELENIUM FROM A FEED STREAM

CROSS REFERENCE TO RELATED APPLICATIONS

This application benefits from the priority of U.S. Provisional Patent Application No. 61/682,609, entitled "System for Removing Selenium from a Feed Stream," filed Aug. 13, 2012, which is hereby incorporated by reference in its entirety.

The following applications are incorporated by reference in their entirety:

U.S. Provisional Patent Application No. 61/682,585, entitled "System for Removing Minerals from a Brine Using Electrodialysis" filed Aug. 13, 2012, U.S. Provisional Patent Application No. 61/682,590, entitled "Heating System for Desalination" filed Aug. 13, 2012, U.S. Provisional Patent Application No. 61/682,596, entitled "System for Removing High Purity Salt from a Brine" filed Aug. 13, 2012, U.S. Provisional Patent Application No. 61/682,603, entitled "System for Rinsing Electrodialysis Electrodes" filed Aug. 13, 2012, and U.S. Provisional Patent Application No. 61/682,612, entitled "System for Producing a Gypsum Slurry for Irrigation" filed Aug. 13, 2012.

BACKGROUND

The subject matter disclosed herein relates generally to feed streams and, more particularly, a system for removing selenium from a feed stream.

There are several regions in the United States (e.g., the southwestern United States including New Mexico, Southern California, and parts of Texas) and throughout the world that experience shortages in potable water supplies due, in part, to the arid climate of these geographic locales. As water supplies are limited, innovative irrigation techniques for farm lands, parks, golf courses, and may be used. One method for obtaining an alternative source of potable water uses desalination systems to produce the potable water.

The desalination process may involve the removal of salts from seawater, agricultural run-off water, and/or brackish ground water brines to produce potable water. Desalination may use an assortment of filtration methods, such as nanofiltration and reverse osmosis, to separate the raw stream into a desalinated water stream and a brine stream. The brine streams may contain various salts and other materials left over after the desalination process, which may result in environmental issues associated with the disposal of the desalination brine.

One such impurity may be selenium. The EPA National Ambient Water Quality criteria adopted by most western states have a 5 part per billion (ppb) limit for protection of aquatic wildlife. In addition, field studies indicate that 2 ppb selenium may impact endangered aquatic species due to bioaccumulation in aquatic food chains. Certain selenium removal techniques use bioreactors and/or hydrometallurgical purification methods. In certain systems, filter cakes with high elemental selenium content may be disposed of. The filter cakes may re-oxidize and leach into rivers and streams over a period of time. Such systems may be unsuitable for selenium removal since the selenium can enter the aquatic food chains. In other systems, hydrometallurgical purification methods are used to produce industrial grade selenium for sale. The hydrometallurgical purification methods are large scale processes that use high heat and a large amount of energy, and produce selenium containing waste water streams. As such, hydrometallurgical purification methods may not be economically or environmentally feasible for desalination facilities. Therefore, energy-efficient and innovative selenium removal systems that remove selenium from feed streams may be beneficial.

BRIEF DESCRIPTION

In one embodiment, a system for removing selenium from a solid feed stream includes a selenium dissolver configured to selectively dissolve elemental selenium from the solid feed stream and to produce a selenium rich solution and a crystallizer coupled to the selenium dissolver and configured to receive the selenium rich solution from the dissolver, to add an acid to the selenium rich solution, to remove purified selenium from the selenium rich solution, and to remove sulfur dioxide from the selenium rich solution.

In another embodiment, a method selectively dissolving elemental selenium from a solid feed stream to produce a selenium rich solution in a selenium dissolver, transferring the selenium rich solution from the selenium dissolver to a crystallizer, adding an acid to the selenium rich solution in the crystallizer to produce purified selenium and sulfur dioxide, removing the purified selenium from the crystallizer, and removing sulfur dioxide from the crystallizer.

In another embodiment, a system includes a pretreatment system configured to remove at least one of gypsum, heavy metals, or fines, or any combination thereof, from a selenium rich feed water to produce a pretreated selenium rich feed water, a biological selenium removal system configured to treat the pretreated selenium rich feed water using microorganisms to generate a solid feed stream and an effluent water, and a selenium recovery system configured to generate purified selenium from the solid feed stream. The selenium recovery system includes a selenium dissolver configured to selectively dissolve the elemental selenium from the solid feed stream and to produce a selenium rich solution and a crystallizer coupled to the selenium dissolver and configured to receive the selenium rich solution from the dissolver, to add an acid to the selenium rich solution, to remove the purified selenium from the selenium rich solution, and to remove sulfur dioxide from the selenium rich solution.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
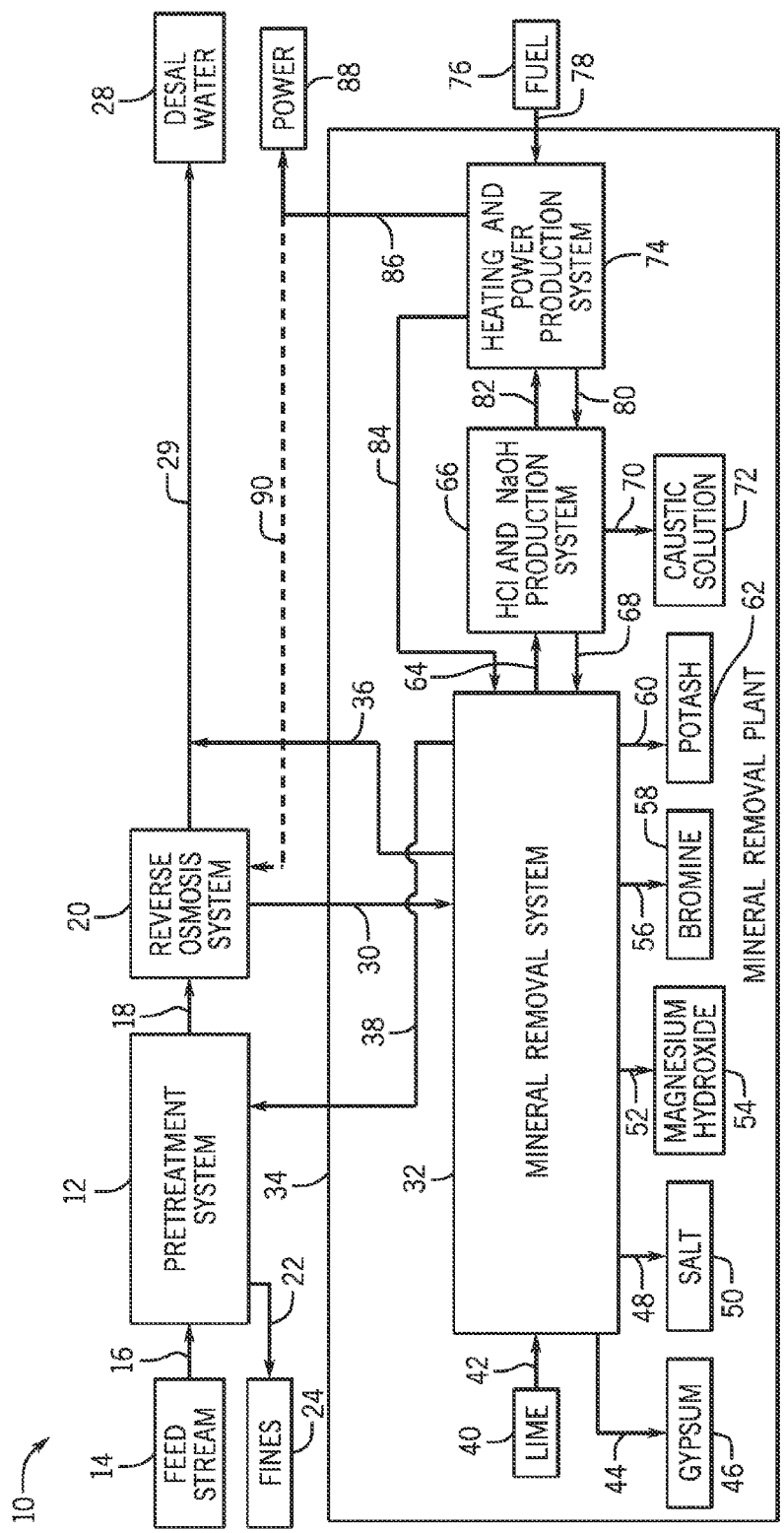
FIG. 1 is a block diagram of an embodiment of a water processing system, in accordance with aspects of the present disclosure.

FIG. 1 is a block diagram of an embodiment of a water processing system 10. The water processing system 10 is used to produce desalinated water from a feed stream and to remove minerals from the feed stream. For example, the water processing system 10 may be used to produce high purity agricultural grade gypsum (e.g., approximately greater than 97 wt % gypsum on a dry basis), industrial grade caustic (e.g., approximately greater than 97 wt % NaOH on a dry basis), industrial grade magnesium hydroxide (e.g., approximately greater than 98 wt % MgO on an ignited basis, or on an ignited oxide basis) suitable for industrial magnesia refractory, industrial grade sodium chloride (e.g., approximately greater than 99.9 wt % NaCl on a dry basis), and/or desalinated water (e.g., approximately less than 1000 wppm total dissolved solids (TDS)) from underground brines, seawater desalination waste brines, and/or brackish water desalination waste brines. Furthermore, the water processing system 10 may use a combination of one or more of gypsum precipitation, magnesium hydroxide precipitation, electrodialysis (ED), and/or softening and nanofiltration (NF) to remove the minerals from brines as industrial grade products and/or to substantially reduce (or eliminate) a waste brine stream.

In the illustrated embodiment, the water processing system 10 includes a pretreatment system 12 configured to receive a feed stream 14 as an input 16. The feed stream 14 may be received from any suitable water source. For example, the feed stream 14 may be received from ground water, seawater, brackish water, and so forth. Moreover, the feed stream 14 may contain various elements and/or compounds. For example, the feed stream 14 may contain sodium chloride (NaCl), sulfate ($SO_4$), calcium (Ca), magnesium (Mg), and/or silicon dioxide (silica or $SiO_2$). In certain embodiments, the feed stream 14 may contain approximately 0.50 to 3.00 g/l NaCl, approximately 0.10 to 1.50 g/l $SO_4$, approximately 0.01 to 0.80 g/l Ca+Mg, and/or approximately 0.01 to 0.30 g/l $SiO_2$. Furthermore, in certain embodiments, the feed stream 14 may have a pH range between approximately 5 and 9. Specifically, the feed stream 14 may have a pH of approximately 8.

The pretreatment system 12 receives the feed stream 14 and removes solid materials (e.g., fines) from the feed stream 14. The pretreatment system 12 provides the pretreated feed stream 14 as a first output 18 to a reverse osmosis (RO) system 20. Moreover, the pretreatment system 12 provides a second output 22 that contains fines 24, such as iron (Fe) and manganese (Mn). The RO system 20 receives the pretreated feed stream 14 and produces desalinated water 28 as a first output 29. In certain embodiments, the desalinated water 28 may include $SiO_2$. Moreover, the desalinated water 28 may have a pH of approximately 7.5. Furthermore, the RO system 20 provides a brine stream as a second output 30 to a mineral removal system 32. In certain embodiments, the desalinated water 28 may be approximately 70 to 90 percent of the output from the RO system 20, and the brine stream may be approximately 10 to 30 percent of the output from the RO system 20. Specifically, in some embodiments, the desalinated water 28 may be approximately 80 percent of the output from the RO system 20, and the brine stream may be approximately 20 percent of the output from the RO system 20. As may be appreciated, while the illustrated embodiment uses the RO system 20, other embodiments may use NF in place of RO.

The mineral removal system 32 is part of a mineral removal plant 34. The mineral removal plant 34 is configured to remove minerals, elements, and/or compounds from the brine stream. As may be appreciated, the brine stream may be provided to the mineral removal plant 34 from any suitable source and/or system. In certain embodiments, the brine stream may include substantial amounts of sodium chloride, sulfate, calcium, and/or magnesium. The mineral removal system 32 may provide one or more outputs 36 that include desalinated water (which may contain silicon dioxide). Furthermore, the one or more outputs 36 may include a disinfectant and/or oxidant. The disinfectant and/or oxidant may be provided to the pretreatment system 12 via an output 38.

A lime based material 40 (e.g., lime, quick lime, dolomitic lime, etc.) may be provided to an input 42 of the mineral removal system 32 to facilitate mineral removal from the brine stream. The mineral removal system 32 may be configured to remove any suitable mineral, elements, and/or compounds from the brine stream. For example, the mineral removal system 32 may provide a first output 44 including gypsum 46 (e.g., agricultural grade gypsum), a second output 48 including salt 50 (e.g., industrial grade sodium chloride), a third output 52 including magnesium hydroxide 54 (e.g., industrial grade magnesium hydroxide), a fourth output 56 including bromine 58, and/or a fifth output 60 including potash 62.

In certain embodiments, the mineral removal system 32 may provide one or more outputs 64 to a hydrochloric acid (HCl) and sodium hydroxide (NaOH) production system 66. Furthermore, the mineral removal system 32 may receive one or more inputs 68 from the HCl and NaOH production system 66. For example, the mineral removal system 32 may provide a sodium chloride brine to the HCl and NaOH production system 66. Moreover, the mineral removal system 32 may receive HCl, caustic, and/or NaOH produced by the HCl and NaOH production system 66. In certain embodiments, the HCl and NaOH production system 66 may provide an output 72 of a caustic solution 70 (e.g., NaOH) or HCl solution that is not used by the mineral removal system 32 (e.g., produced to be sold).

The mineral removal plant 34 also includes a heating and power production system 74. In certain embodiments, the heating and power production system 74 may include a natural gas engine and/or a boiler. The heating and power production system 74 is configured to receive a fuel 76 at an input 78. The fuel 76 may be any suitable fuel, such as natural gas. The heating and power production system 74 is configured to provide one or more outputs 80 to the HCl and NaOH production system 66. The one or more outputs 80 may include power, steam, hot water, any suitable heated fluid, and so forth. Moreover, the heating and power production system 74 is configured to receive a cooled fluid (such as water) via one or more inputs 82. As illustrated, the heating and power production system 74 is configured to provide power to the mineral removal system 32 via a first output 84. Moreover, the heating and power production system 74 includes a second output 86 configured to provide power 88 to another system and/or to provide a power output 90 to the RO system 20.

Figure 2:
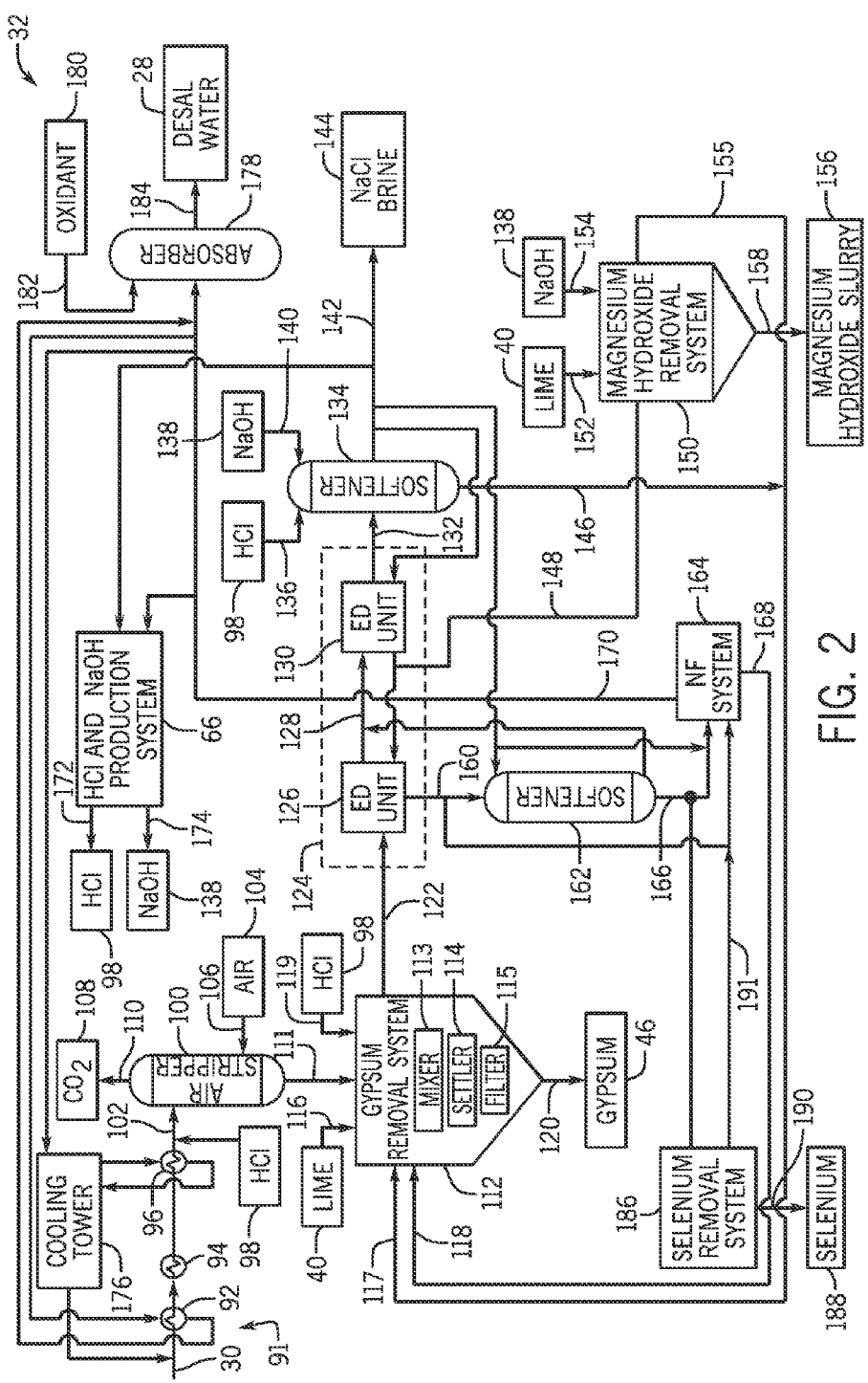
FIG. 2 is a block diagram of an embodiment of a mineral removal system, in accordance with aspects of the present disclosure.

FIG. 2 is a block diagram of an embodiment of the mineral removal system 32. As previously described, the mineral removal system 32 receives at an input the brine stream from the output 30 of the RO system 20. As may be appreciated, the brine stream may contain various elements and/or compounds. For example, the brine stream may contain NaCl, $SO_4$, Ca, Mg, and/or $SiO_2$. In certain embodiments, the brine stream may contain approximately 3.0 to 8.0 g/l NaCl, approximately 3,000 to 8,000 weight parts per million (wppm) $SO_4$, approximately 100 to 400 wppm Mg, approximately 200 to 600 wppm Ca, and/or approximately 50 to 200 wppm $SiO_2$. Furthermore, in certain embodiments, the brine stream may have a pH range between approximately 4 and 8. Specifically, the brine stream may have a pH of approximately 6. In the illustrated embodiment, a temperature control system 91 is used to control heating of the brine stream. Moreover, the temperature control system 91 includes a first heat exchanger 92, a second heat exchanger 94, and a third heat exchanger 96 to aid in controlling the temperature of the brine stream.

The brine stream is mixed with HCl 98 to convert bicarbonate ($HCO_3^-$) and carbonate ($CO_3^{2-}$) in the brine stream to $CO_2$, thereby decreasing the pH to less than 4. The acidified brine stream is routed to an air stripper 100 via a first input 102. The air stripper 100 uses air 104 provided to a second input 106 of the air stripper 100 to facilitate removal of the $CO_2$ 108 from the brine stream via a first output 110. In certain embodiments, multiple stages are used in the air stripper 100 to enable a low residual (e.g., less than approximately 2 ppm). As may be appreciated, a low $CO_2$ residual may inhibit carbonate reformation and scaling when the pH of the brine stream is increased during the various downstream brine treatment steps.

The $CO_2$ stripped brine stream is provided via a second output 111 of the air stripper 100 to a gypsum removal system 112. The gypsum removal system 112 may include a mixer 113, a settler 114, and a filter 115 to facilitate removal of the gypsum 46 from the brine stream (e.g., feed stream). Accordingly, within the mixer 113, the $CO_2$ stripped brine stream is mixed with: the lime based material 40 (e.g., lime, quick lime, dolomitic lime, etc.) received by a first input 116 of the gypsum removal system 112, recycled concentrated calcium chloride ($CaCl_2$) brine (e.g., such as a brine containing approximately 4 to 25 wt % $CaCl_2$) received by a second input 117, and recycled NF non-permeate (e.g., a sodium sulfate ($Na_2SO_4$) rich brine) received by a third input 118. In certain embodiments, such as embodiments with feed brines having a lower $Na_2SO_4$ content, the second output 111 may bypass the gypsum removal system 112. Accordingly, only the second input 117 and the third input 118 may be provided to the gypsum removal system 112. Furthermore, in such an embodiment, the second output 111 may be mixed with a brine output stream 122 from the gypsum removal system 112.

HCl 98 may be added to the gypsum removal system 112 via a fourth input 119. In certain embodiments, the lime based material 40 and the HCl 98 may be pre-mixed into the recycle calcium chloride brine stream to increase calcium content in the mixer 113 of the gypsum removal system 112 and/or in the mineral removal system 32. For example, this may be beneficial when the $SO_4$ to (Mg+Ca) molar ratio is greater than approximately 1.0 since it provides supplemental calcium to allow substantial (e.g., complete, nearly complete, etc.) sulfate removal as gypsum 46. In other embodiments, commercial calcium chloride brine, flakes, or pellets may be added to the mixer 113 of the gypsum removal system 112 when the brine stream is deficient in calcium. Furthermore, in certain embodiments, HCl 98 and limestone may also be added to the recycle calcium chloride brine and the brine stripped in a second air stripper to remove the residual $CO_2$. As may be appreciated, limestone may be procured at a lower cost than lime; however, the second air stripper may be necessitated by the use of the limestone.

The overall molar ratio of Ca to $SO_4$ in the brine stream entering the gypsum removal system 112 may be controlled to approximately 0.8 to 1.2 by calcium addition to the mixer 113 (e.g., HCl 98 plus the lime based material 40, $CaCl_2$, and/or HCl 98 plus limestone with additional air stripping) as discussed above, and/or by removing a portion of the concentrated $CaCl_2$ brine as a byproduct. Recycled gypsum 46 seed crystals are added to the mixture within the mixer 113 of the gypsum removal system 112. The calcium in the concentrated $CaCl_2$ brine stream reacts with the sulfate in the brine stream received by the gypsum removal system 112 from the air stripper 100 and the recycle NF non-permeate to precipitate gypsum 46. In certain embodiments, approximately 50% to 70% of the sulfate is removed from the brine stream. The presence of gypsum 46 seed crystals in the mixer 113 (e.g., a turbulent mixer) at neutral pH (e.g., a pH of approximately 6 to 8) may facilitate gypsum 46 precipitation kinetics, thereby enabling rapid gypsum precipitation. At the mixer 113 effluent the solution reaches near saturation conditions (e.g., slightly supersaturated) with respect to gypsum 46 and the slurry is pumped to the settler 114.

In addition to gypsum 46 precipitation, insoluble calcium fluoride ($CaF_2$) also precipitates in the mixer 113 thereby removing a substantial portion of the fluoride from the stripped brine stream; thereby inhibiting fluoride scaling in the electrodialysis (ED) system. In the settler 114 the gypsum 46 crystals settle and the saturated near solids free solution is decanted off, and filtered by the filter 115 (e.g., a sand filter, a microfilter, an ultrafilter, and so forth) to remove residual gypsum 46 particles. A small amount of softened salt brine is recycled to the settler 114 overflow to increase gypsum 46 solubility and desaturate the brine stream, thereby inhibiting scaling in the filter 115 and other downstream units. The settler 114 bottoms may be routed to a hydroclone and filter to wash (e.g., with desalinated product water) and concentrate the gypsum 46 into a saleable washed filter cake. In certain embodiments, the filter cake may include approximately 70 to 100 wt % gypsum 46. Specifically, the filter cake may include approximately 90 wt % gypsum 46. Thus, gypsum 46 is provided as an output 120 from the gypsum removal system 112. The fine solids overflow stream from the hydroclone is recycled to the mixer 113 as seed crystals. The filtrate from the filter 115 is recycled to the settler 114.

The gypsum removal system 112 may remove approximately 60 to 75% of the gypsum received from the second output 111 and produces the brine stream output 122 having a reduced amount of gypsum relative to the second output 111. For example, the brine stream output 122 (e.g., recycle brine stream output) may contain less than approximately 5 g/l gypsum, while the second output 111 may contain approximately 12 to 20 g/l gypsum. Furthermore, in certain embodiments, the brine stream output 122 may contain approximately 5.0 to 15.0 g/l NaCl and/or approximately 1,000 to 3,000 wppm $SO_4$. Moreover, the brine stream output 122 may have a pH of approximately 6. The brine stream output 122 is provided to an electrodialysis (ED) system 124. Furthermore, as illustrated, the gypsum removal system 112 is fluidly coupled to the ED system 124. In certain embodiments, a guard cartridge filter may be disposed between the brine stream output 122 and the ED system 124 to filter the brine stream output 122 thereby blocking gypsum scale from passing to the ED system 124. The ED system 124 is configured to receive the brine stream output 122 from the gypsum removal system 112, to produce a substantially sulfate hardness (e.g., Ba, Sr, Ca) free sodium sulfate solution, to produce a sodium chloride solution, and to produce a mineral solution. In the illustrated embodiment, the ED system 124 includes a first ED unit 126 that provides an intermediate output 128 to a second ED unit 130. In certain embodiments, the intermediate output 128 may include approximately 70 to 120 g/l total dissolved solids (TDS).

The first ED unit 126 (e.g., mixed chloride extraction ED) extracts a substantial portion (e.g., approximately 65% to 80%) of the magnesium chloride, calcium chloride, and sodium chloride from the brine stream output 122 using non-permselective cationic membranes and monovalent permselective anionic membranes to produce a concentrated (e.g., approximately 3 to 25 wt %) barium chloride, strontium chloride, magnesium chloride, calcium chloride, sodium chloride brine that is substantially sulfate free that is provided via the intermediate output 128 to the second ED unit 130. At a pH of approximately 6 both boric acid and silica are in a non-ionic form and thus are not extracted by the ED into the intermediate output 128 having the concentrated brine stream. As may be appreciated, barium (Ba), strontium (Sr), magnesium, and calcium chlorides are preferentially extracted versus sodium chloride through non-permselective cation membranes. Thus, a diluate brine output 160 from the first ED unit 126 is a dilute $Na_2SO_4$ brine with reduced barium, strontium, calcium, and magnesium content and very low chloride content (e.g., a substantially sulfate hardness free sodium sulfate solution). For example, the substantially sulfate hardness free sodium sulfate solution may include less than approximately 200 mg/l (Ca+Sr+Ba) and/or approximately 3 to 5 g/l sulfate.

In certain embodiments, the first ED unit 126 may include a two-stage ED configuration for mixed chloride extraction ED. For example, a first stage may extract approximately 70-90% of the mixed chlorides as a low sulfate, high concentration product concentrate. Furthermore, a second stage may be fed by the first stage diluate and the brine stream output 122. Residual mixed chlorides in the first stage diluate may be extracted into the brine stream output 122, which may be fed to the first stage. As may be appreciated, the two-stage design may increase ED power consumption and size, however, the two-stage design may facilitate a sharper separation and higher recoveries of sulfate in relation to the diluate product and chloride in relation to the mixed chloride concentrate product.

In some embodiments, a portion of an NF non-permeate from a segregated fully softened feed may be used as a supplemental rinse solution in cells adjacent to the electrode cells, thereby inhibiting calcium contamination of an electrode rinse solution. The return supplemental rinse solution may be recycled to the gypsum settler 114. Moreover, for seawater based brines, NF permeate may be used as a supplemental rinse solution (due to its high salt content and higher conductivity) which may be recycled back to the NF feed.

The high concentration calcium chloride brine from the intermediate output 128 is provided to the second ED unit 130 (e.g., a NaCl extraction ED) that selectively removes a substantial portion (e.g., approximately 80% to 95%) of the NaCl using monovalent permselective cation and anion membranes. In certain embodiments, the second ED unit 130 may include a two-stage ED configuration for NaCl extraction. For example, a first stage may extract approximately 70 to 90% of the NaCl as a low hardness, high concentration product concentrate. Moreover, the second stage may be fed by the first stage diluate and may produce a low NaCl, $CaCl_2$, $MgCl_2$ rich product diluate, and an intermediate concentration NaCl concentrate with higher hardness, which is recycled back to the feed of the first stage. As may be appreciated, the two-stage design may increase ED power consumption and size; however, the two-stage design may allow for a sharper separation and higher recoveries of $CaCl_2$ and $MgCl_2$ in relation to the diluate product and NaCl in relation to the concentrate product.

A NaCl brine (e.g., sodium chloride solution) is provided as an output 132 from the second ED unit 130. The NaCl brine has a low magnesium content and is provided (e.g., pumped) to an ion exchange brine softener 134 (e.g., such as an Amberlite™ IRC747 manufactured by The Dow Chemical Company of Midland, Mich.) where a substantial portion (e.g., approximately greater than 99%) of the calcium and magnesium are removed. Dilute HCl 98 is provided via an input 136 and NaOH 138 (e.g., approximately 4 wt %) is provided via an input 140 to the softener 134. The HCl 98 and the NaOH 138 are used to regenerate the ion exchange brine softener 134. The ion exchange brine softener 134 provides an output 142 of a high concentration NaCl brine 144. The high concentration NaCl brine 144 may include approximately 150 to 300 g/l NaCl. In certain embodiments, the NaCl brine 144 may be provided to the HCl and NaOH production system 66 to aid in producing HCl and NaOH. Furthermore, the NaCl brine 144 may be used to regenerate a second ion exchange softener 162, such as in brackish water feed brines. Moreover, the NaCl brine 144 may be used to produce a high purity salt for a chlor alkali plant, bleach plant, mixed oxidant plant, other chemical and industrial uses, and/or for any suitable purpose. As illustrated, a purge stream may provide the NaCl brine 144 to the second ED unit 130. The pH of the purge stream may be controlled to approximately 2.5 by HCl 98 injection, thereby converting residual fluoride to hydrogen fluoride (HF) and inhibiting fluorite scaling or NaCl brine contamination with fluoride. In certain embodiments, RO permeate or other low sulfate, low silica, low boric acid containing water may be added to prevent gypsum scaling if there is significant leakage of sulfate through the monovalent anion permselective membrane in the first ED unit 126. A low volume softener reject stream containing the calcium and magnesium may be provided by an output 146 and recycled directly to the settler 114 of the gypsum removal system 112.

The second ED unit 130 produces a concentrated $CaCl_2$, $MgCl_2$ brine stream low in NaCl (e.g., mineral solution) that is provided via an output 148. The output 148 is recirculated to the first ED unit 126 to aid in further extraction of the NaCl and the production of the high concentration NaCl brine 144. Furthermore, the output 148 is provided to a magnesium hydroxide removal system 150. As illustrated, the ED system 124 is fluidly coupled to the magnesium hydroxide removal system 150. In some embodiments (e.g., brackish water), the brine stream may contain approximately 500 to 2,000 wppm $SO_4$ and/or approximately 500 to 2000 wppm Mg, while in other embodiments (e.g., seawater), the brine stream may contain approximately 1,500 to 4,000 wppm $SO_4$ and/or approximately 600 to 2500 wppm Mg. Furthermore, the brine stream may have a pH of approximately 6. Moreover, the brine stream may include approximately 40 to 60 g/l TDS. In certain embodiments, the magnesium hydroxide removal system 150 may include a mixer (e.g., mixer 113), a settler (e.g., settler 114), and a filter (e.g., filter 115) to facilitate removal of the magnesium hydroxide from the concentrated $CaCl_2$, $MgCl_2$ brine stream (e.g., feed stream). In some embodiments, the magnesium hydroxide removal system 150 may be configured to remove approximately 90 to 98% of Mg from the brine stream.

The low NaCl concentrated $CaCl_2/MgCl_2$ product brine from the ED system 124 is enriched in magnesium and lean in sulfate due to the upstream gypsum removal system 112, and the ED system 124. In certain embodiments, the brine provided to the output 148 may be approximately 1 to 15% of the brine stream 30 provided to the mineral removal system 32. The lime based material 40 (e.g., lime, dolomitic lime, etc.) is provided to the magnesium hydroxide removal system 150 via an input 152 to precipitate magnesium hydroxide. A similar arrangement to the gypsum removal system 112 (e.g., mixer 113, settler 114, filter 115, etc.) may be used to produce a washed magnesium hydroxide filter cake and a low magnesium effluent brine. A portion of the magnesium hydroxide removal system 150 effluent may be used to produce a slaked lime slurry to facilitate lime mixing with the $CaCl_2/MgCl_2$ ED product brine. In addition to the lime based material 40, excess NaOH 138, such as from the HCl and NaOH production system 66, may be provided to the magnesium hydroxide removal system 150 via an input 154, thereby facilitating a reduction in the lime based material 40 and/or reducing the $CaCl_2$ export for brines with high (Ca+Mg) to $SO_4$ molar feed ratios (e.g., where the ratio of (Ca+Mg) to $SO_4$ is greater than approximately 1.0).

Overflow from a settler of the magnesium hydroxide removal system 150 may provide an output 155 of concentrated $CaCl_2$ brine that is recycled back to the gypsum removal system 112. The $CaCl_2$ in the brine combines with sulfate in the primary gypsum settler 114 to facilitate precipitation of gypsum 46. In certain embodiments, the output 155 may have a pH of approximately 10. The magnesium hydroxide removal system 150 outputs magnesium hydroxide slurry 156 via an output 158. In certain embodiments, the magnesium hydroxide slurry 156 may include greater than approximately 98 wt % magnesium oxide (MgO) on a calcinated basis.

Returning to the first ED unit 126, the first ED unit 126 provides an ED dilute stream (e.g., a substantially sulfate hardness free sodium sulfate solution) to an output 160. Moreover, for low salinity brackish water feeds (e.g., NaCl less than approximately 10 g/l) provided to the mineral removal system 32, the ED diluate stream from the first ED unit 126 has a TDS content of less than approximately 7 g/l (e.g., 5 g/l). Accordingly, as illustrated, the ED diluate stream from the first ED unit 126 is provided to a strong acid cation (SAC) ion exchange softener 162. The lower TDS content of the ED diluate stream enables the use of SAC ion exchange softening resins which are regenerated using NaCl brine 144, as discussed previously. The SAC ion exchange softener 162 exchanges calcium and magnesium ions in the ED diluate stream for sodium and inhibits gypsum scaling in a downstream NF system 164 that receives an output 166 from the SAC ion exchange softener 162. As illustrated, a purge stream of the NaCl brine 144 may be provided to the NF system 164 in conjunction with the output 166 to facilitate descaling.

All or part of the ED diluate stream is routed to the SAC ion exchange softener 162 based a scaling potential of the NF system 164. Relatively high sulfate hardness levels in the SAC softener effluent 166 (e.g., approximately 10-100 ppm) are used to minimize brine consumption. SAC ion exchange softener 162 resins are regenerated using the NaCl brine 144, and the spent brine from regeneration containing mainly $CaCl_2$ and $MgCl_2$ with residual NaCl is routed to the second ED unit 130, thereby facilitating recycling of the residual NaCl for producing the concentrated CaCl2, MgCl2 brine low in NaCl suitable for feed to the magnesium hydroxide removal system 150. As may be appreciated, for seawater based NF brines or high salinity feed brines, softening is not required to inhibit gypsum scaling in the downstream NF system 164. This is because the elevated NaCl content in the NF feed and non-permeate increases the gypsum solubility, thereby inhibiting scaling in the NF unit.

The ED diluate stream from the first ED unit 126, which has been optionally softened by the SAC ion exchange softener 162 is routed to the NF system 164 via outputs 160 and/or 166. In certain embodiments, approximately 60 to 80% of the ED diluate stream permeates the NF. The remaining 20 to 40% NF non-permeate contains substantially all of the sulfate, approximately 60 to 90% of the calcium, approximately 80 to 90% of the magnesium, and approximately 20 to 50% of the NaCl. Thus, a non-permeate stream output from the NF system 164 via output 168 is slightly supersaturated with respect to gypsum 46 (e.g., 1.6 saturation index defined as ion product/Ksp, which corresponds to a dissolved gypsum content of 125% of saturation). Significant scaling does not occur on the NF membranes of the NF system 164 because the kinetics of gypsum crystallization are slow in the NF membranes (e.g., no seed crystals, acidic pH, low mixing turbulence, etc.).

Periodically (e.g., approximately every 6-8 hours) a slug of high purity NaCl brine (e.g., 100-200 g/l NaCl, less than 50 ppm Ca, less than 20 ppm SO4) is injected individually into each NF element of the NF system 164. This may result in a brief (e.g., 30 second) period of reverse flow across the NF membrane in a direct osmosis, high salinity process. The high purity NaCl brine directs the gypsum microcrystals to be removed from the surface of the NF elements and dissolved in the NaCl brine, thereby inhibiting long term growth of gypsum scale since the seed microcrystals are removed before scaling kinetics can accelerate. The supersaturated NF non-permeate containing substantially all of the sulfate is recycled to the settler 114 of the gypsum removal system 112 via the output 168. In certain embodiments, the supersaturated NF non-permeate may contain approximately 8,000 to 12,000 wppm $SO_4$, approximately 300 to 500 wppm Ca, approximately 100 to 300 wppm Mg, approximately 0.8 to 1.5 g/l NaCl, and/or approximately 15 to 25 g/l TDS.

An NF permeate stream is provided via an output 170 from the NF system 164. For low salinity brackish water brine feeds the NF permeate stream may have a low TDS and thereby may meet EPA drinking water standards. Furthermore, as may be appreciated, NF membranes with increased NaCl removal may be desirable to produce drinking water with lower TDS content. It should be noted that the selection of the NF membrane may be made so that silica concentration and scaling does not occur on the NF membrane with high NaCl removal.

As illustrated, the NF permeate stream from output 170 is provided to the HCl and NaOH production system 66. The HCl and NaOH production system 66 is used to produce one or more HCl 98 outputs 172 and/or to produce one or more NaOH 138 outputs 174. Furthermore, the NF permeate stream from output 170 may be provided to the first heat exchanger 92 to facilitate heat transfer from the brine stream 30 to the NF permeate. Moreover, the NF permeate stream from output 170 may be provided to a cooling tower 176 where the NF permeate stream is cooled before flowing through the third heat exchanger 96 to facilitate heat transfer from the brine stream 30 to the NF permeate. As illustrated, the cooling tower 176 may also provide a portion of the NF permeate stream to the brine stream 30.

As may be appreciated, arsenic (e.g., as arsenite) in the brine stream 30 (e.g., from brackish groundwater treatment) may pass through the gypsum removal system 112 and the NF system 164, thereby ending up in the NF permeate stream from the output 170. Accordingly, in certain embodiments, the arsenic is not removed by NF membranes. If necessary to meet drinking water standards the arsenic may be removed from the NF permeate stream using an arsenic absorber 178.

Within the arsenic absorber 178, the NF permeate stream is chlorinated with chlorine, sodium hypochlorite, and/or mixed oxidant 180 received via an input 182 thereby converting the arsenite to arsenate. The stream is then routed to a granular ferric hydroxide (GFH) or granular ferric oxide (GFO) absorption bed where the arsenate is absorbed and chemically sequestered as non-leachable ferric arsenate. Periodically the spent GFH or GFO may be removed and/or stored onsite for future arsenic reclaiming. Moreover, fresh GFH or GFO may be provided into the absorption beds. The absence of essentially all the sulfate and chloride in the NF permeate water along with its slightly acidic pH (e.g., approximately 5 to 6), make the GFH or GFO absorption of arsenic highly efficient and cost effective. The desalinated water 28 is provided by an output 184 from the arsenic absorber 178. While the arsenic absorber 178 is included in the illustrated embodiment, other embodiments may not include the arsenic absorber 178. In certain embodiments, the desalinated water 28 may contain approximately 50 to 150 mg/l $SiO_2$, approximately 10 to 50 mg/l Ca+Mg, approximately 0.3 to 0.9 g/l NaCl, and/or approximately 500 to 1000 ppm TDS.

In certain embodiments, a slipstream of the softened ED diluate stream from the first ED unit 126 may be routed to a biological or chemical selenium removal system 186. The selenium may be concentrated in this stream because it typically exists as selenate which has similar properties to sulfate. Moreover, the selenium does not permeate NF or anion monovalent permselective ED membranes and is more soluble than sulfate in the presence of calcium. Thus, the low NaCl, sulfate, $MgCl_2$ and $CaCl_2$ concentration in the ED diluate stream provide optimal conditions for the chemical or biological removal processes. For example, in certain embodiments, the ED diluate stream may contain approximately 3,000 to 5,000 wppm $SO_4$, approximately 100 to 150 wppm Ca, approximately 25 to 75 wppm Mg, and/or approximately 0.5 to 1.0 g/l NaCl. The selenium removal system 186 is configured to remove selenium from the ED diluate stream, to provide selenium 188 (e.g., greater than approximately 99.5 wt % purity) from a first output 190, and to provide a substantially selenium free ED diluate stream 191 to the NF system 164.

Figure 3:
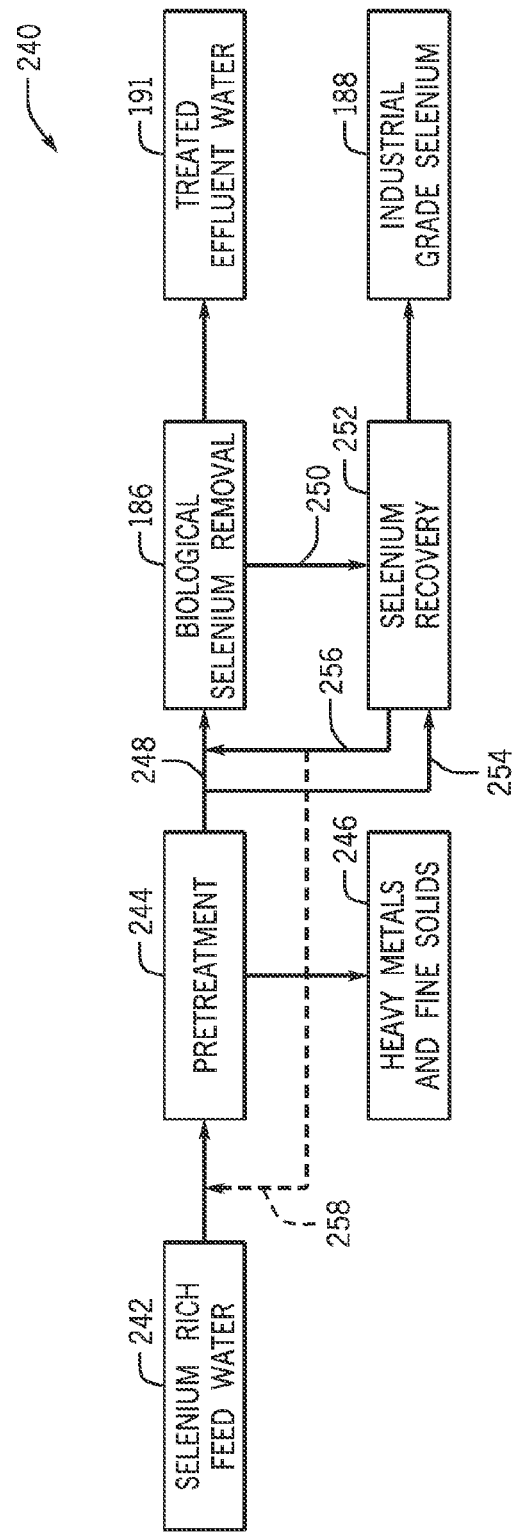
FIG. 3 is a block diagram of an embodiment of a selenium rich feed water treatment system, in accordance with aspects of the present disclosure.

FIG. 3 is a block diagram of an embodiment of a selenium rich feed water treatment system 240. A selenium rich feed water 242 (e.g., a high hardness feed water) may be pretreated in a pretreatment system 244 to remove heavy metals and fine solids 246. In certain embodiments, the pretreatment system 244 may be a gypsum settler where lime or calcium chloride is added to precipitate gypsum from the selenium rich feed water 242. If heavy metals are present in the selenium rich feed water 242, then organosulfides may be added in the pretreatment system 244 to precipitate the heavy metals as insoluble sulfides or hydroxides. Pretreated feed water 248 from the pretreatment system 244 may then be transferred to the biological selenium removal system 186 (e.g., the advanced biological metals (ABMet) removal system available from the General Electric Company of Schnectady, N.Y. or the iBIO® Biological Wastewater Treatment System available from Degremont Technologies-Infilco of Richmond, Va.). Alternatively, the biological selenium removal system 186 may be fed pretreated (e.g., gypsum and chloride reduced), softened, sodium sulfate containing water from the water processing system 10. Examples of this feed water 242 include, but are not limited to, the slipstream of the softened ED diluate stream from the first ED unit 126 shown in FIG. 2, the SAC softener effluent 166 shown in FIG. 2, or any combination thereof. As described above, the heavy metals (if any) may be removed in the strong acid cation (SAC) ion exchange softener 162. The heavy metals in the softener regeneration stream (i.e., output 148) may be routed to the magnesium hydroxide removal system 150 (e.g., a magnesium hydroxide settler and calciner) where they may be ultimately sequestered as impurities in an MgO product (e.g., a MgO based steel mill blast furnace refractory product).

In certain embodiments, the biological selenium removal system 186 may remove substantially all (e.g., between approximately 90% to 99%) of the selenium and any residual heavy metals from the pretreated feed water 248 by reducing the soluble selenate and selenite to insoluble selenium to produce the treated effluent water 191 (e.g., substantially selenium free ED diluate stream). The biological selenium removal system 186 may also reduce a small amount of sulfate to sulfide, which precipitates out any residual heavy metals (e.g., cadmium, nickel, zinc, or lead) present as a separate sulfide phase. The bioreactors of the biological selenium removal system 186 may be periodically backwashed with low selenium effluent water (e.g., treated effluent water 191) and the selenium, heavy metal sulfides, and part of the biomass may be removed as a backwash effluent slurry. The slurry may be settled and filtered in a filtration unit, such as a plate and frame filter, producing a cake 250 with approximately 30 wt % solids. The biomass in the cake 250 may retain significant water, thereby inhibiting further dewatering by filtration. The cake 250 may then be conveyed to a selenium recovery system 252 to produce the purified selenium 188 (e.g., industrial grade selenium with greater than approximately 99.5 wt % purity), as described in detail below. In certain embodiments, a portion 254 of the pretreated feed water 248 may also be provided to the selenium recovery system 252 and a recycle nutrient rich water 256 may be recycled from the selenium recovery system 252 to the biological selenium removal system 186, as described in detail below.

Figure 4:
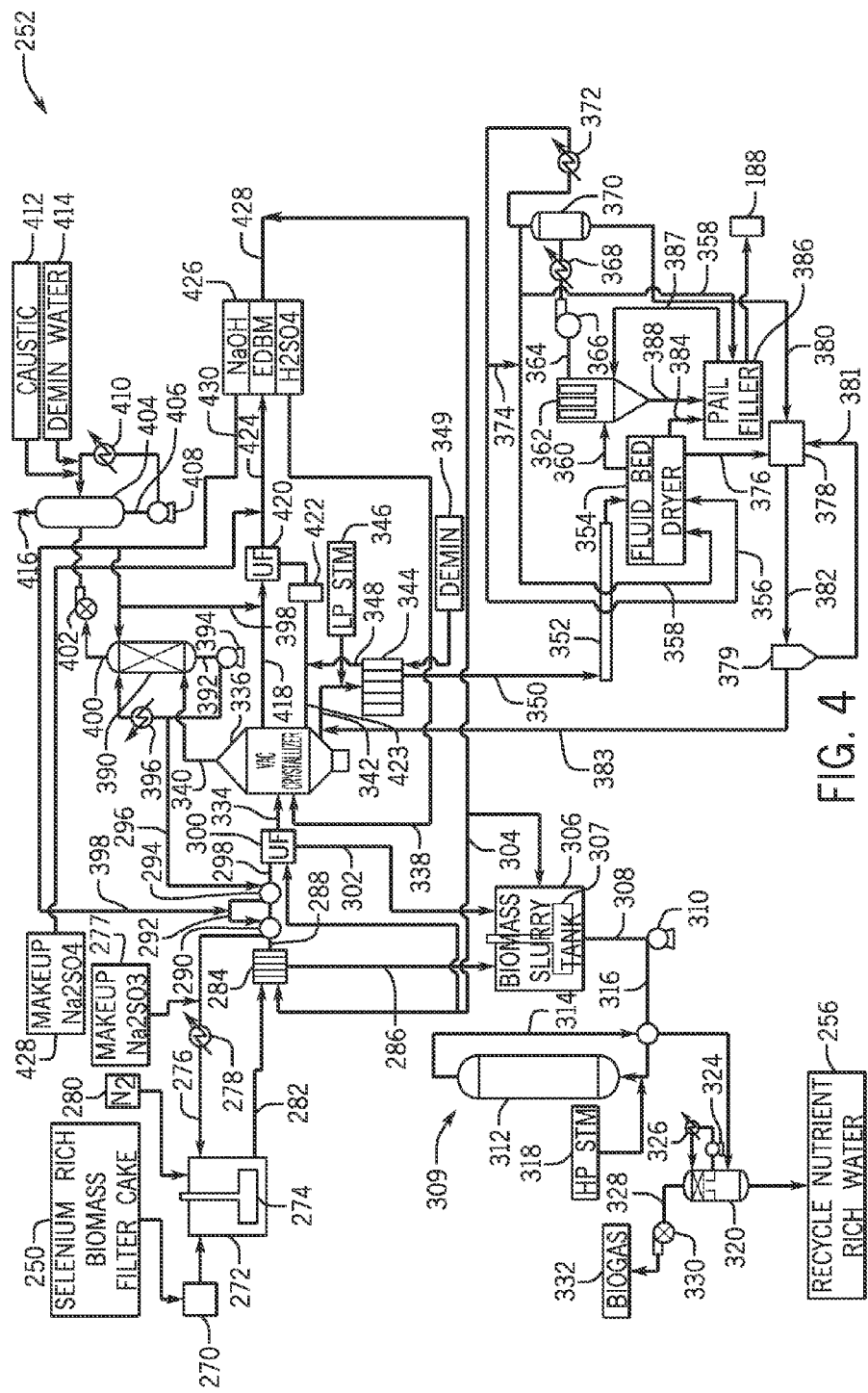
FIG. 4 is a block diagram of an embodiment of a selenium recovery system, in accordance with aspects of the present disclosure.

FIG. 4 is a block diagram of an embodiment of the selenium recovery system 252. The filter cake 250 may be conveyed by a conveyor 270, such as a screw conveyor or a belt conveyor, to a selenium dissolver tank 272 agitated by an agitator 274, where hot (e.g., between approximately 60 to 90 degrees Celsius), concentrated (e.g., between approximately 12 to 15 wt %) recycle sodium sulfite solution 276 with a pH between approximately 8 to 10 is used to selectively leach the elemental selenium from the filter cake 250. The recycle sodium sulfite solution 276 and a small amount (e.g., less than approximately 1% of the recycle sodium sulfite) of makeup sodium sulfite solution 277 may be heated using a hot water trim heater 278. A low pressure nitrogen purge 280 (e.g., blanket) may be used to exclude oxygen from the vapor space of the selenium dissolver tank 272. The selenium may react with the sodium sulfite according to the following reaction to form a thiosulfate analog:

$$Na_2SO_3 + Se \rightarrow Na_2SeSO_3 \quad \text{(EQUATION 1)}$$

in which $Na_2SO_3$ represents sodium sulfite, Se represents selenium, and $Na_2SeSO_3$ represents sodium selenosulfite. Sufficient residence time and excess sodium sulfite is provided in the selenium dissolver tank 272 to dissolve substantially all the selenium (e.g., greater than approximately 95%) into the hot sodium sulfite solution. Trace amounts of calcium, magnesium, and heavy metals are leached from the filter cake 250 because of the elevated pH of the leaching solution.

As shown in FIG. 4, a selenium rich solution 282 (e.g., a solution including greater than approximately 10 wt % $Na_2SeSO_3$) from the selenium dissolver tank 272 may be transferred to a filtration unit 284 (e.g., a plate and frame filter) to be filtered to separate a first biomass material 286 (e.g., containing the biosolids and trace heavy metal sulfides (if present)) from a filtered solution 288, which may then be cooled to between approximately 38 to 40 degrees Celsius in a first heat exchanger 290 using a cold recycle solution 292 containing sodium bisulfite and/or sodium sulfite. In certain embodiments, a second heat exchanger 294 may be used to provide additional cooling of the filtered solution 288 using a sodium bisulfite purge 296. A cooled selenium rich solution 298 is routed from the first heat exchanger 290 and/or the second heat exchanger 294 to an ultrafiltration (UF) system 300 (e.g., a pressurized system) where a second biomass material 302 (e.g., residual bacterial and fines) is removed from the solution 298.

Solids (e.g., the first biomass material 286 and the second biomass material 302) may be periodically removed from the filtration unit 284 and the UF system 300 after they are purged or backflushed with spent electrodialysis biopolar membrane (EDBM) brine 304. The filter cake from the filtration unit 284 and the backwash slurry from the UF system 300 may be collected in a backwash slurry tank 306 agitated by agitator 307, where they are mixed with additional spent EDBM brine 304. A backwash slurry 308, consisting mainly of biomass, may be routed from the backwash slurry tank 306 to a wet oxidation or hydrolysis unit 309 (e.g., a Zimpro Wet Oxidation unit available from Siemens Water Technologies of Rothschild, Wis.) via a slurry pump 310. In the wet oxidation or hydrolysis unit 309, the backwash slurry 308 may be heated to a temperature greater than approximately 260 degrees Celsius at a high pressure (e.g., approximately 6895 kPa) to breakdown the biosolids into smaller organic molecules suitable as nutrients for the biological selenium removal system 186. The elevated pressure in the wet oxidation or hydrolysis unit 309 may enable the water in the backwash slurry 308 to remain in the liquid phase, and a pressure vessel 312 may provide residence time for the water phase organic material to hydrolyze. If necessary, high pressure compressed air may be added to the feed of the backwash slurry 308 to both oxidize and hydrolyze the organic material.

In the illustrated embodiment, a feed product heat exchanger 316 may provide most of the heating and cooling duty for the wet oxidation or hydrolysis unit 309. For example, an overhead stream 314 may be used to heat the backwash slurry 308 via the feed product heat exchanger 316. In addition, either indirect high pressure steam 318 heating or live high pressure steam 318 injection may be used as a trim heater. A vacuum flash 320 with a chilled water pump 324 and chilled water exchanger 326 may be used as a trim cooler and product water flash. The vacuum flashing may provide additional decomposition of the biomass, increasing the assimilable organic carbon in the treated water. Biogas 328 from the vacuum flash 320 may be compressed in a vacuum pump 330 (e.g., a liquid ring vacuum pump) and routed to a boiler, incinerator, or gas engine as a compressed biogas 332. The treated effluent water (e.g., recycle nutrient rich water 256) may be cooled to a temperature less than approximately 40 degrees Celsius in the vacuum flash 320 and includes the non-volatile assimilable organic carbon molecules to be recycled to the biological selenium removal system 186.

As shown in FIG. 4, a selenium rich UF permeate 334 may be routed from the UF system 300 to a vacuum crystallizer 336 along with a recycled dilute (e.g., approximately 8 wt %) sulfuric acid 338. The sulfuric acid 338 may react with the selenium rich UF permeate 334 at a reduced temperature (via the heat exchangers 290 and/or 294) and reduced pH (via the sulfuric acid 338) based on the following reaction:

$$Na_2SeSO_3 + H_2SO_4 \rightarrow Na_2SO_4(\text{dissolved}) + Se(\text{solid}) + SO_2(\text{vapor}) \qquad (\text{EQUATION 2})$$

where $Na_2SeSO_3$ represents sodium selenosulfite, $H_2SO_4$ represents sulfuric acid, $Na_2SO_4$ represents sodium sulfate, Se represents selenium, and $SO_2$ represents sulfur dioxide. The solid elemental selenium may be in the red allotrope form, which has a relatively low melting point (e.g., approximately 46 degrees Celsius). The vacuum crystallizer 336 may be operated at low vacuum (e.g., approximately 3 kPa) to produce an operating temperature of approximately 24 degrees Celsius. A small amount of excess sulfuric acid may be used to reduce the pH within the vacuum crystallizer 336 to a value of approximately 0.5, thereby converting substantially all of the bisulfite and sulfite to sulfur dioxide vapor 340. A small amount of water is also vaporized and leaves the top of the vacuum crystallizer 336 with the sulfur dioxide vapor 340.

A selenium slurry 342 may be recirculated around the vacuum crystallizer 336 to promote crystal growth to the desired product selenium particle size with an internal pump and optionally with an external circulation pump. A fraction of the selenium slurry 342 may be pumped through one of two vertical batch centrifuges 344 to continuously remove product selenium 350. Live low pressure steam 346 may be injected into the selenium slurry 342 upstream of the centrifuges 344 to heat the selenium slurry 342 to a temperature between approximately 82 to 88 degrees Celsius. This rapid heating of the selenium slurry 342 may convert the red low melting selenium allotrope to the gray high melting crystalline allotrope and may enhance water separation in the centrifuges 344. A hot centrate 348 may be recycled to the vacuum crystallizer 336, where the hot centrate 348 is re-cooled, thereby producing additional water vapor in the sulfur dioxide vapor 340. The batch vertical centrifuges 344 may collect the product selenium crystals and may be periodically washed with demineralized water 349 and peeled to remove the product selenium 350 from the centrifuges 344. The peeling speed of the centrifuges 344 may be adjusted so that one centrifuge is peeling while the other is collecting, thereby producing an approximately constant flow of wet product selenium 350, which may be conveyed by a conveyor 352 (e.g., a screw conveyor) to a fluid bed dryer 354.

As shown in FIG. 4, the fluid bed dryer 354 may use heated recirculating air 356 to dry the selenium 350 at a reduced temperature (e.g., between approximately 27 to 30 degrees Celsius), thereby assuring sintering free operation. Cool recirculating air 358 (e.g., between approximately 16 to 21 degrees Celsius) may be used to cool the selenium in the fluid bed dryer 354 after drying with the heated recirculating air 356. Humid air 360 from the fluid bed dryer 354 (e.g., between approximately 70 to 90% relative humidity) may be routed to a baghouse 362, which may remove the fines from an air stream 364. A blower 366 may pull the air 364 through the baghouse 362 and route the air 364 to a chilled water exchanger 368 and a knock out drum 370, thereby cooling the air 364 to a temperature between approximately 10 to 15 degrees Celsius and condensing between approximately 30 to 50% of the moisture from the air 364. A portion of the chilled air (e.g., recirculating air 358) may be routed to the fluid bed dryer 354 and/or a pail filler 386 for selenium product cooling and the remainder of the chilled air may be routed to a hot water heater 372, which increases the air temperature to between approximately 38 to 40 degrees Celsius. A portion 374 of the heated air is mixed with the chilled air (e.g., recirculating air 358) to the fluid bed dryer 354 and/or the pail filler 386 to raise its temperature approximately 5 degrees Celsius above the dew point of the chilled air. The remainder of the heated air (e.g., recirculating air 356) may be routed to the inlet drying section of the fluid bed dryer 354, where it is used to dry the wet product selenium 350.

The dried selenium powder from the fluid bed dryer 354 may be screened in a vibrating or gyrating screen (e.g., of 200 mesh or 0.074 mm) to remove oversize particles 376. The oversize particles 376 may be collected in a silo and periodically routed to a batch circulating attritor system 378, which may be equipped with a chilled water jacketed mix tank. Condensate 380 from the air drying and/or chilled demineralized water may be added to the mix tank of the attritor system 378 together with the oversize particles 376. After grinding by the attritor system 378, a slurry 382 may be routed to a separation tank 379, where the coarse material is settled out as a bottoms stream 381 and pumped back to the attritor system 378. A separation tank overflow slurry stream 383 may be continuously pumped back to the centrifuge 344 circuit upstream of the injection of the low pressure steam 346. Undersize particles 384 from the screen may be routed to the pail filler 386 (e.g., an automatic enclosed pail filler) in addition to fines 388 from the baghouse. The pail filler 386 may load the dried, screened product selenium 188 into approximately 23 kg pails (e.g., polyethylene lined pails) and seal the pails for shipment. Dust and humid air 387 from the pail filler 386 may be routed to the baghouse 362 and chilled dust free air 358 may be supplied from the knock out drum 370 to allow circulation for humidity control and dust removal.

As shown in FIG. 4, the water vapor and $SO_2$ vapor 340 from the vacuum crystallizer 336 may be routed to an absorber 390, which may be integral to the vapor body of the vacuum crystallizer 336 to minimize pressure drop in the vacuum system. The vapor 340 may be scrubbed with a recirculated sodium bisulfite solution 392 pumped via an absorber pump 394. A chilled water exchanger 396 may cool the recirculated sodium bisulfite solution 392 to allow the absorber 390 to operate at a temperature between approximately 15 to 21 degrees Celsius. Both the water vapor and $SO_2$ are absorbed and condensed into the recirculated sodium bisulfite solution 392. Recycle dilute caustic 398 (e.g., approximately 10 wt %) may be injected into the circulating loop to maintain the pH of the circulating solution at a value of approximately 5, such that substantially all the $SO_2$ is absorbed as bisulfite, but any $CO_2$ present remains in the vapor phase.

The sodium bisulfite purge 296 (e.g., concentrated sodium bisulfite solution between approximately 15 to 20 wt %) may be routed from the absorber 390 to second heat exchanger 294, which heats the sodium bisulfite purge 296 and cools the selenium rich solution (e.g., filtered solution 288). The recycle caustic 398 may be added to the heated sodium bisulfite purge 296, thereby converting the bisulfite to sulfite and the sodium sulfite solution (e.g., cold recycle solution 292) may be routed to the first heat exchanger 290 to further heat the sodium sulfite solution and cool the selenium rich solution (e.g., filtered solution 288). Two pass heating with intermediate caustic injection may be used to prevent sodium sulfite precipitation in the cold solution. The sodium sulfite solution (e.g., recycle sodium sulfite solution 276) may be further heated in the hot water trim heater 278 and routed to the selenium dissolver tank 272.

The residual non-condensables 400 (e.g., air and $CO_2$) from the absorber 390 and chilled water exchanger 396 may be routed to a vacuum pump 402 (e.g., a liquid ring vacuum pump), which may provide the vacuum for the vacuum crystallizer 336. The discharge from the vacuum pump 402 may be routed to an atmospheric knockout drum 404 with a chilled water recycle and spray system. Specifically, a recycle condensate 406 may be pumped via a knockout pump 408 through a cooler 410. A small amount of caustic 412 and demineralized water 414 may be added to the recycle condensate 406 to maintain the pH at a value of approximately 6, thereby allowing the recycle condensate 406 to capture any residual $SO_2$ to help reduce $SO_2$ emissions. Nearly all the $CO_2$ present in the recycle condensate 406 may remain in the vapor phase, but a small portion of $CO_2$ may be recycled to the absorber 390 with a purge stream. A portion of the cooled recycle condensate 406 may recycled to the vacuum pump 402 as seal water and most of the remainder recirculated. A small purge may be taken from the recirculating system back to the absorber 390 to reduce buildup of sodium bisulfite in the recirculating condensate system. The scrubbed non-condensables 416, including any $CO_2$, may be vented from the top of the knockout drum 404.

In the illustrated embodiment, an acidic brine purge 418 from the vacuum crystallizer 336 may be neutralized with caustic 398 to increase its pH to a value of approximately 8 and may be routed to a pressurized lean selenium UF unit 420 to remove fines and insolubles. A UF permeate 424 may then be routed to an EDBM unit 426. The UF unit 420 may be periodically backflushed with UF permeate 424 to tank 422 and the solids slurry 423 continuously recycled to the vacuum crystallizer 336. Makeup softened sodium sulfate 428 may be mixed with the UF permeate 424 and fed to the EDBM 426. In the EDBM unit 426, the sodium and sulfate in the brine from the UF permeate 424 may be extracted separately to produce dilute caustic 430 (e.g., approximately 10 wt %) and sulfuric acid 338 (e.g., approximately 8 wt %). Both caustic 430 and sulfuric acid 338 may be recirculated around the EDBM 426 to increase the concentration of caustic and sulfuric acid. The sodium sulfate brine may also be recirculated around the EDBM 426 to increase sodium sulfate extraction. The caustic 430 may be used to neutralize the brine purge stream 418 of the vacuum crystallizer 336, absorb $SO_2$ from the vacuum crystallizer vapor 340, and/or convert the absorbed bisulfite solution to sulfite in the sodium bisulfite purge 296. The sulfuric acid 338 may be recycled to the vacuum crystallizer 336 to reduce the pH, thereby causing selenium precipitation and $SO_2$ generation. In certain embodiments, makeup sodium sulfate solution 428 (e.g., the portion 254 of the pretreated feed water 248) may be used to provide makeup sodium sulfate to the EDBM 426 instead of sodium sulfate recycle. Spent EDBM brine 304 may be used to purge the filtration unit 284, backwash the UF system 300, and/or slurry the leached biomass filter cake in the backwash slurry tank 306.

Figure 5:
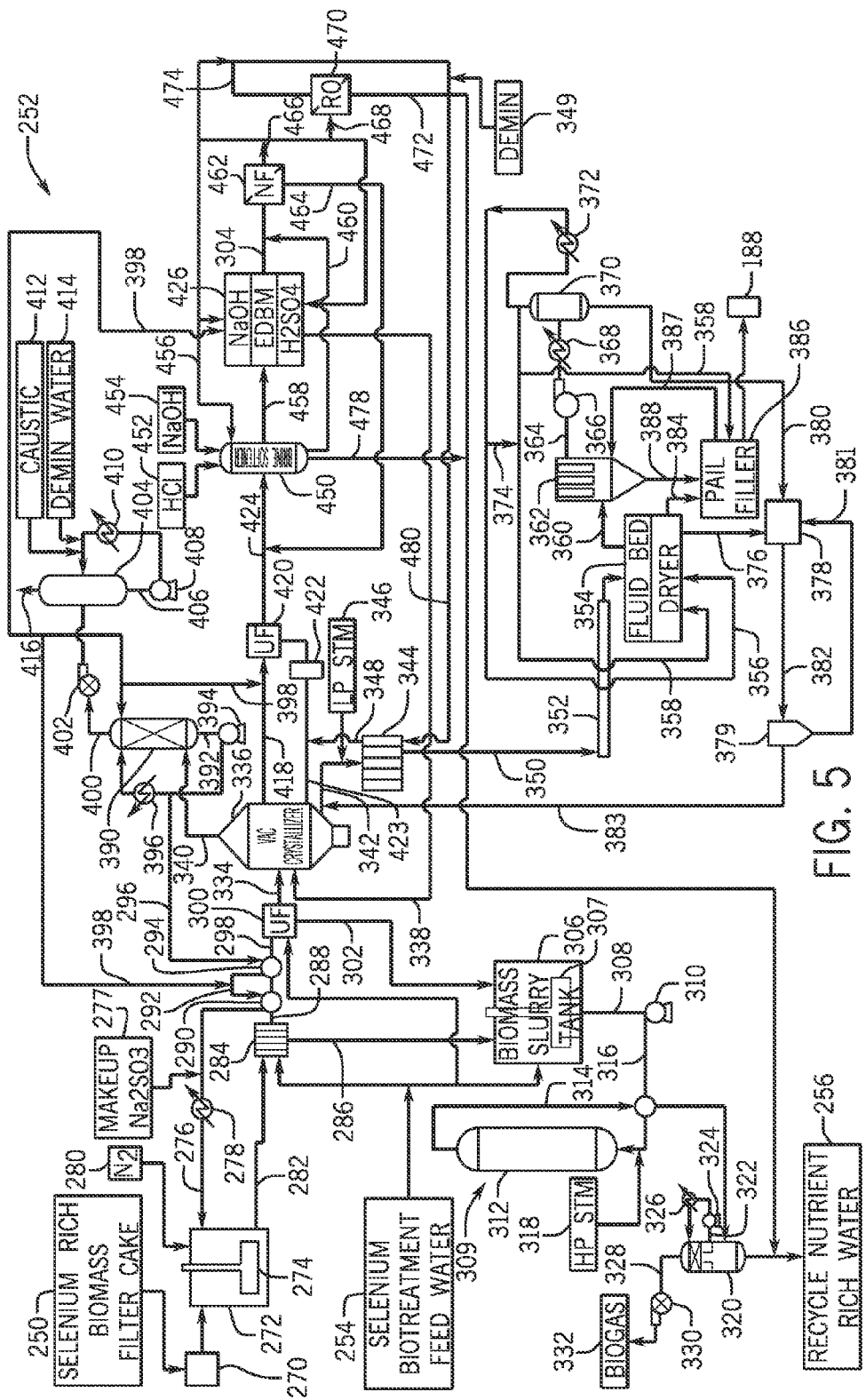
FIG. 5 is a block diagram of another embodiment of a selenium recovery system, in accordance with aspects of the present disclosure.

FIG. 5 is a block diagram of another embodiment of a selenium recovery system. Elements in FIG. 5 in common with those shown in FIG. 4 are labeled with the same reference numerals. In the illustrated embodiment, solids are periodically removed from the filtration unit 284 and UF system 300 after they are purged or backflushed with the portion 254 of the pretreated feed water 248. The filter cake from the filtration unit 284 and backwash slurry from the UF system 300 may be collected in the backwash slurry tank 306, where they are mixed with additional biological selenium treatment unit effluent water (e.g., portion 254).

In addition, as shown in FIG. 5, a brine softener 450 may be used to remove any residual hardness in the UF permeate 424 and a recycle sodium sulfate 464, producing a softened UF permeate 458, which is then fed to the EDBM 426. The softener 450 may be periodically regenerated with HCl 452 and NaOH 454. Spent regeneration brine 478 may be neutralized with the NaOH 454 to a pH value of between approximately 7 to 8 and recycled to the biological selenium removal system 186 as part of the recycle nutrient rich water 256.

In the EDBM unit 426, the sodium and sulfate in the brine from the softened UF permeate 458 is extracted separately to produce the dilute caustic 398 (e.g., approximately 10 wt %) and sulfuric acid 338 (e.g., approximately 8 wt %). Both the caustic 398 and the sulfuric acid 338 may be recirculated around the EDBM 426 to increase the concentration of caustic and sulfuric acid. The sodium sulfate brine may also recirculated around the EDBM 426 to increase sodium sulfate extraction. Spent EDBM brine 304 and spent softener rinse water 460 may be routed to a nanofiltration unit (NF) 462, which recovers substantially all the residual sodium sulfate as a concentrated non-permeate stream (e.g., between approximately 2 to 3 wt % $Na_2SO_4$). NF nonpermeate 464 may be recycled back to the brine softener 450. NF permeate 466 may be used as makeup water for the caustic and sulfuric acid produced in the EDBM 426 and as rinse water 456 for the softener 450. A portion 468 of the NF permeate 466 may be routed to a reverse osmosis unit 470 to remove residual sodium chloride from the crystallizer system as a concentrated brine 472 that is recycled back to the biological selenium unit feed (e.g., recycle nutrient rich water 256). An RO permeate 474 may be mixed with the NF permeate 466. A small amount of demineralized water makeup may be added to the RO permeate 474 to compensate for the water loss to the RO brine and close the water balance around the crystallizer system. The NF permeate 466 may be used to rinse the brine softener 450 and provide makeup water to the NaOH and $H_2SO_4$ sections of the EDBM 426. The RO permeate 474 and makeup demineralized water 349 may be sent as a centrifuge cake wash 480 to the centrifuges 344.

Figure 6:
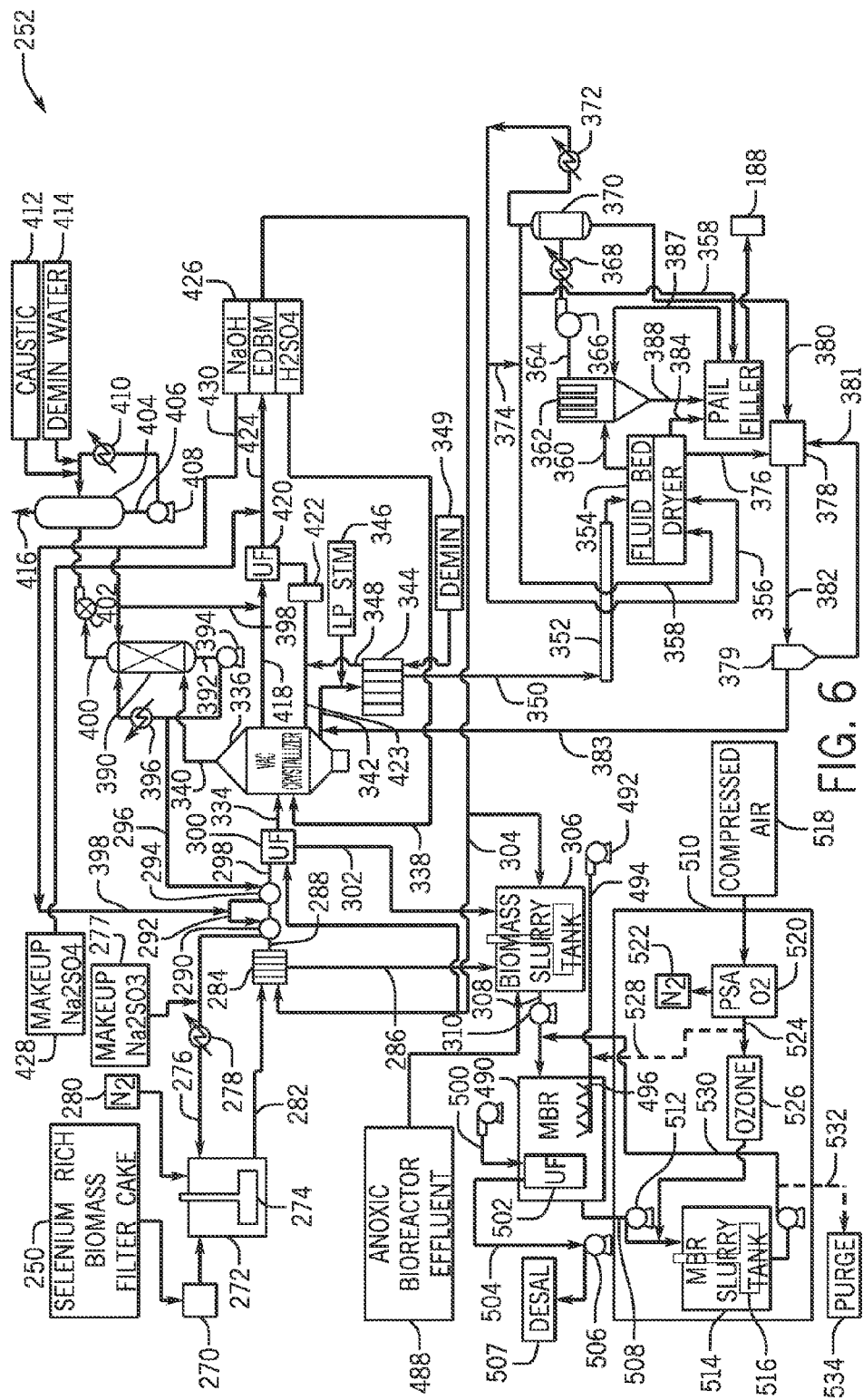
FIG. 6 is a block diagram of yet another embodiment of a selenium recovery system, in accordance with aspects of the present disclosure.

FIG. 6 is a block diagram of yet another embodiment of a selenium recovery system. Elements in FIG. 6 in common with those shown in FIG. 4 are labeled with the same reference numerals. In one embodiment, the backwash slurry 308 is treated in a biosludge ozonation unit 510. For example, a combination of aerobic sludge oxidation (e.g., in a membrane bioreactor (MBR) 490) is used with recycle sludge ozonation in the biosludge ozonation unit 510, to essentially fully oxidize the biosolids of the backwash slurry 308 to $CO_2$ and fully oxidize any mineral species back to their soluble oxidized form. Specifically, an air blower 492 may introduce air 494 into a distributor 496 of the MBR 490. In addition, a scour air blower 498 may be used to introduce scour air 500 into an ultrafiltration section 502 of the MBR 490. An output 504 from the ultrafiltration section 502 may be removed using a pump 506 and transferred to a desalination unit 507. A solids slurry output 508 from the ultrafiltration section 502 may be transferred via a pump 512 to an MBR slurry tank 514 to be agitated by agitator 516. In addition, compressed air 518 may be transferred to a pressure swing adsorption (PSA) unit 520 to separate nitrogen 522 from oxygen 524. The oxygen 524 is then converted into ozone 526 and a portion 528 of the oxygen 524 may be transferred to the distributor 496. An output 530 from the MBR slurry tank 514 may be transferred to the MBR 490 to be mixed with the backwash slurry 308. A portion 532 of the solids slurry in the MBR slurry tank 514 may be purged to the desalination feed 534 to remove inorganic solids and prevent their buildup in the MBR 490. The treated effluent water 191 (e.g., anoxic bioreactor effluent 488) from the selenium bioreactor 186 may be optionally routed to the MBR 490 via the backwash slurry tank 306 to oxidize any dissolved minerals and remove any fine suspended solids. The MBR effluent water 504 may be used for irrigation (reclaimed water) or routed to a desalination system for minerals removal and potential minerals recovery.

Use of the selenium recovery system 252 described in detail above may offer several benefits. For example, the revenue from the high value high purity (e.g., greater than approximately 99.5 wt %) industrial grade selenium 188 may more than offset the capital and operating costs of the selenium recovery system 252. In addition, the selenium recovery system 252 does not produce water or solid waste streams. Further, little to no purchased chemicals are used in the operation of the selenium recovery system 252. In particular, substantially all the sulfuric acid 424 and bisulfite are recycled. A small amount of HCl and NaOH may be used to regenerate the softeners, which remove the trace amounts of calcium and magnesium hardness that may be present from the leaching of the biological selenium filter cake 250. Only a small amount of makeup sodium sulfite is used to replace the minimal $SO_2$ losses to sulfate oxidation.

In addition, the selenium recovery system 252 has a low capital cost and is economical for small scale selenium recovery because of the high process intensity. For example, the vacuum crystallizer 336 may be used as a reactor, selenium settler, brine cooler, and $SO_2$ separator. The EDBM 426 recovers both sulfuric acid and caustic and eliminates the use of a waste water treatment plant. Further, no dryer plugging or sintering occurs in the selenium recovery system 252. In addition, there are few or no selenium dust emissions and there is a low amount of heating and cooling due to the circulating, low temperature fluid bed drying design with upstream liquid water removal in the selenium recovery system 252.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
    a mineral removal system disposed downstream from a desalination system to which the mineral removal system is fluidly coupled, wherein the mineral removal system is configured to receive a brine stream from the desalination system and to generate a selenium-rich feed water from the brine stream, wherein the mineral removal system comprises:
        a selenium dissolver configured to receive a selenium-rich filter cake generated from the selenium-rich feed water, to selectively dissolve elemental selenium from the selenium-rich filter cake, and to produce a selenium-rich solution; and
        a crystallizer fluidly coupled to the selenium dissolver and configured to receive the selenium-rich solution from the selenium dissolver, to add an acid to the selenium-rich solution, to remove purified selenium from the selenium-rich solution, and to remove sulfur dioxide from the selenium-rich solution.

2. The system of claim 1, comprising a centrifuge fluidly coupled to the crystallizer, wherein the centrifuge is configured to receive the purified selenium from the crystallizer and to separate purified selenium particles from water.

3. The system of claim 2, comprising a dryer fluidly coupled to the centrifuge and to a pail filler, the dryer is configured to receive the purified selenium particles from the centrifuge, to dry the purified selenium particles to generate a purified selenium powder, and to supply the purified selenium powder to the pail filler.

4. The system of claim 3, comprising a dust collector system fluidly coupled to the dryer and to the pail filler, the dust collector system is configured to remove and recover the purified selenium particles from air used in the dryer and to direct the recovered purified selenium particles to the pail filler.

5. The system of claim 1, wherein the selenium dissolver is configured to selectively dissolve the elemental selenium from the solid feed stream using a sodium sulfite solution.

6. The system of claim 1, comprising a filtration system disposed between the selenium dissolver and the crystallizer and configured to remove biosolids, heavy metal sulfides, bacteria, fines, or any combination thereof, from the selenium-rich solution to generate a biomass material, wherein the biomass material comprises the biosolids, the heavy metal sulfides, the bacteria, the fines, or the combination thereof.

7. The system of claim 6, comprising a slurry tank downstream from and fluidly coupled to the filtration system, the slurry tank is configured to receive the biomass material from the filtration system and to generate a slurry by mixing the biomass material with effluent water from a biological selenium treatment unit, spent brine from an electrodialysis bipolar membrane (EDBM) unit, or any combination thereof.

8. The system of claim 7, comprising a wet oxidation unit or a hydrolysis unit fluidly coupled to the slurry tank, wherein the wet oxidation unit or the hydrolysis unit is configured to receive the slurry from the slurry tank and to convert the slurry into organic molecules and a biogas.

9. The system of claim 7, comprising an ozonation unit fluidly coupled to the slurry tank, wherein the ozonation unit is configured to receive the slurry from the slurry tank and to convert the slurry into carbon dioxide and soluble mineral oxides.

10. The system of claim 1, comprising an electrodialysis bipolar membrane (EDBM) unit fluidly coupled to the crystallizer, wherein the EDBM is configured to produce the acid and to supply the acid to the crystallizer.

11. The system of claim 10, comprising a brine filtration unit fluidly coupled to the crystallizer and to the EDBM unit, wherein the brine filtration unit is configured to filter a brine purge from the crystallizer, to generate a permeate, and to provide the permeate to the EDBM unit.

12. The system of claim 11, comprising a brine softener fluidly coupled to the brine filtration unit and to the EDBM unit, wherein the brine softener is configured to receive the permeate and to remove calcium cations, magnesium cations, or both, from the permeate.

13. The system of claim 1, comprising a sulfur dioxide absorber fluidly coupled to the crystallizer, wherein the sulfur dioxide absorber is configured to receive crystallizer vapors, to recover sulfur dioxide from the crystallizer vapors using sodium bisulfate, and to vent non-condensables.

14. The system of claim 1, comprising a biological selenium removal system fluidly coupled to the selenium dissolver, wherein the biological selenium removal system is configured to treat the selenium-rich feed water using microorganisms, to generate the selenium-rich filter cake and an effluent water, and to direct the solid feed stream to the selenium dissolver.

15. A system, comprising:
a pretreatment system configured to receive a selenium-rich feed water and to remove gypsum, heavy metals, fines, or any combination thereof, from the selenium-rich feed water to produce a pretreated selenium-rich feed water;
a biological selenium removal system fluidly coupled to the pretreatment system and configured to receive and treat the pretreated selenium-rich feed water using microorganisms to generate a solid feed stream and an effluent water; and
a selenium recovery system fluidly coupled to the biological selenium removal system, wherein the selenium recovery system is configured to receive the solid feed stream and to generate purified selenium from the solid feed stream, and wherein the selenium recovery system comprises:
a selenium dissolver configured to selectively dissolve elemental selenium from the solid feed stream and to produce a selenium-rich solution; and
a crystallizer fluidly coupled to the selenium dissolver, wherein the crystallizer is configured to receive the selenium-rich solution from the dissolver, to add an acid to the selenium-rich solution, to remove purified selenium from the selenium-rich solution, and to remove sulfur dioxide from the selenium-rich solution.

16. The system of claim 15, wherein the selenium recovery system is configured to recycle a nutrient rich water to the biological selenium removal system.

17. The system of claim 15, wherein the selenium recovery system is configured to receive a portion of the pretreated selenium-rich feed water from the pretreatment system.

18. A system comprising:
a selenium dissolver configured to receive a selenium-rich filter cake generated from a selenium-rich feed water stream, to selectively dissolve elemental selenium from the selenium-rich filter cake, and to produce a selenium-rich solution;
a crystallizer fluidly coupled to the selenium dissolver and configured to receive the selenium-rich solution from the selenium dissolver, to add an acid to the selenium-rich solution, to remove purified selenium from the selenium-rich solution, and to remove sulfur dioxide from the selenium-rich solution; and
an electrodialysis bipolar membrane (EDBM) unit fluidly coupled to the crystallizer, wherein the EDBM is configured to produce the acid and to supply the acid to the crystallizer.

19. The system of claim 18, comprising a brine filtration unit fluidly coupled to the crystallizer and to the EDBM unit, wherein the brine filtration unit is configured to filter a brine purge from the crystallizer, to generate a permeate, and to provide the permeate to the EDBM unit.

20. The system of claim 18, comprising a centrifuge fluidly coupled to the crystallizer, wherein the centrifuge is configured to receive the purified selenium from the crystallizer and to separate purified selenium particles from water.

* * * * *